United States Patent
Levy

(10) Patent No.: US 11,818,165 B2
(45) Date of Patent: *Nov. 14, 2023

(54) MALWARE DETECTION USING MACHINE LEARNING

(71) Applicant: Sophos Limited, Abingdon (GB)

(72) Inventor: Joseph H. Levy, Farmington, UT (US)

(73) Assignee: Sophos Limited, Abingdon (GB)

( * ) Notice: Subject to any disclaimer, the term of this patent is extended or adjusted under 35 U.S.C. 154(b) by 374 days.

This patent is subject to a terminal disclaimer.

(21) Appl. No.: 17/098,084

(22) Filed: Nov. 13, 2020

(65) Prior Publication Data

US 2021/0144154 A1 May 13, 2021

Related U.S. Application Data

(63) Continuation of application No. 15/864,329, filed on Jan. 8, 2018, now Pat. No. 10,841,333.

(51) Int. Cl.
*H04L 9/40* (2022.01)
*G06N 20/00* (2019.01)
*G06F 21/56* (2013.01)

(52) U.S. Cl.
CPC ............ *H04L 63/145* (2013.01); *G06F 21/56* (2013.01); *G06N 20/00* (2019.01); *H04L 63/1416* (2013.01)

(58) Field of Classification Search
CPC ... H04L 63/145; H04L 63/1416; H04L 63/14; G06F 21/56; G06N 20/00
See application file for complete search history.

(56) References Cited

U.S. PATENT DOCUMENTS

| | | |
|---|---|---|
| 8,181,244 B2 | 5/2012 | Boney |
| 8,201,243 B2 | 6/2012 | Boney |
| 8,418,250 B2 | 4/2013 | Morris et al. |
| 8,719,932 B2 | 5/2014 | Boney |
| 8,726,389 B2 | 5/2014 | Morris et al. |
| 8,763,123 B2 | 6/2014 | Morris et al. |
| 8,806,627 B1 * | 8/2014 | Aharoni ............... G06F 21/14 726/22 |

(Continued)

FOREIGN PATENT DOCUMENTS

WO WO-2019136444 7/2019

OTHER PUBLICATIONS

Aron, Jacob , "Computers learn to create photos of bedrooms and faces on demand", https://www.newscientist.com/article/dn28548-computers-learn-to-create-photos-of-bedrooms-and-faces-on-demand/ Nov. 25, 2015 , 2 pages.

(Continued)

*Primary Examiner* — Ali S Abyaneh
(74) *Attorney, Agent, or Firm* — Strategic Patents, P.C.

(57) ABSTRACT

Synthetic training sets for machine learning are created by identifying and modifying functional features of code in an existing malware training set. By filtering the resulting synthetic code to measure malware impact and novelty, training sets can be created that predict novel malware and to seek to preemptively exhaust the space of new malware. These synthesized training sets can be used in turn to improve training of machine learning models. Furthermore, by repeating the process of new code generation, filtering and training, an iterative machine learning process may be created that continuously narrows the window of vulnerabilities to new malicious actions.

20 Claims, 4 Drawing Sheets

(56) References Cited

U.S. PATENT DOCUMENTS

| | | | |
|---|---|---|---|
| 8,856,505 B2 | 10/2014 | Schneider | |
| 9,413,721 B2 | 8/2016 | Morris et al. | |
| 9,578,045 B2 | 2/2017 | Jaroch et al. | |
| 9,705,904 B1* | 7/2017 | Davis | G06F 21/562 |
| 9,992,214 B1* | 6/2018 | Xiao | G06F 21/563 |
| 10,257,224 B2 | 4/2019 | Jaroch et al. | |
| 10,284,591 B2 | 5/2019 | Giuliani et al. | |
| 10,599,844 B2 | 3/2020 | Schmidtler et al. | |
| 11,409,869 B2 | 8/2022 | Schmidtler et al. | |
| 2013/0097706 A1* | 4/2013 | Titonis | G06F 21/566 |
| | | | 726/22 |
| 2013/0343390 A1* | 12/2013 | Moriarty | H04L 43/50 |
| | | | 370/392 |
| 2016/0292420 A1* | 10/2016 | Langton | G06F 21/53 |
| 2016/0381042 A1* | 12/2016 | Zhang | H04L 63/1416 |
| | | | 726/24 |
| 2019/0007434 A1* | 1/2019 | McLane | H04L 63/1416 |
| 2019/0215329 A1 | 7/2019 | Levy | |

OTHER PUBLICATIONS

Kim, Jin-Young et al., "Malware Detection Using Deep Transferred Generative Adversarial Networks", Springer International Publishing Oct. 24, 2017, pp. 556-564.

"Gym-malware", https://github.com/EndgameInc/gym-malware 2018, 4 Pages.

Hu, Weiwei et al., "Generating Adversarial Malware Examples for Black-Box Attacks Based on GAN", https://arxiv.org; arXiv:1702. 05983v1 Feb. 20, 2017, 7 Pages.

Shabtai, Asaf et al., "Detection of Malicious Code by Applying Machine Learning Classifiers on Static Features: a State-of-the-Art Survey", Feb. 1, 2009, 14 pages.

Goodfellow, Ian J. et al., "Generative Adversarial Nets Ian", Jun. 10, 2014, 9 pages.

USPTO, "U.S. Appl. No. 15/864,329 Non-Final Office Action dated Jan. 27, 2020", 24 pages.

USPTO, "U.S. Appl. No. 15/864,329 Final Office Action dated Jul. 7, 2020", 23 pages.

USPTO, "U.S. Appl. No. 15/864,329 Notice of Allowance dated Jul. 29, 2020", 9 pages.

ISA, "PCT Application No. PCT/US19/12709 International Search Report and Written Opinion dated Mar. 7, 2019", 11 pages.

WIPO, "PCT Application No. PCT/US19/12709 International Preliminary Report on Patentability dated Jul. 24, 2020", 7 pages.

UKIPO, "UK Application No. 2011381.7 Examination Report dated Sep. 10, 2020", 6 pages.

* cited by examiner

US 11,818,165 B2

MALWARE DETECTION USING MACHINE LEARNING

CROSS-REFERENCE TO RELATED APPLICATIONS

This application is a continuation of U.S. patent application Ser. No. 15/864,329, filed Jan. 8, 2018, the entire contents of which is hereby incorporated herein by reference.

TECHNICAL FIELD

This application relates to enterprise network security, and more specifically to the use of machine learning to support and augment malware detection in an enterprise network.

BACKGROUND

Various techniques are known for securing endpoints in an enterprise network against malicious software, such as the techniques described in commonly-owned U.S. patent application Ser. No. 14/263,955 filed on Apr. 28, 2014, U.S. application Ser. No. 14/485,759 filed on Sep. 14, 2014, U.S. patent application Ser. No. 15/042,862 filed on Feb. 12, 2016, U.S. patent application Ser. No. 15/098,684 filed on Apr. 14, 2016, and U.S. patent application Ser. No. 15/429,291 filed on Feb. 10, 2017, each of which is hereby incorporated by reference in its entirety. While machine learning can be used in this context to train a model to recognize malware, machine learning exhibits certain biases and limitations. In particular, the performance of a machine learning detection engine may degrade as new malware deviates from the training sets used to initially train the detection engine.

There remains a need for techniques to enhance training of machine learning systems in order to improve the detection of new, previously unseen malware threats.

SUMMARY

Synthetic training sets for machine learning are created by identifying and modifying functional features of code in an existing malware training set. By filtering the resulting synthetic code to measure malware impact and novelty, training sets can be created that predict novel malware and to seek to preemptively exhaust the space of new malware. These synthesized training sets can be used in turn to improve training of machine learning models. Furthermore, by repeating the process of new code generation, filtering and training, an iterative machine learning process may be created that continuously narrows the window of vulnerabilities to new malicious actions.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Embodiments will now be described with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as implying a chronological order or otherwise limiting any corresponding element unless expressly state otherwise.

Figure 1:
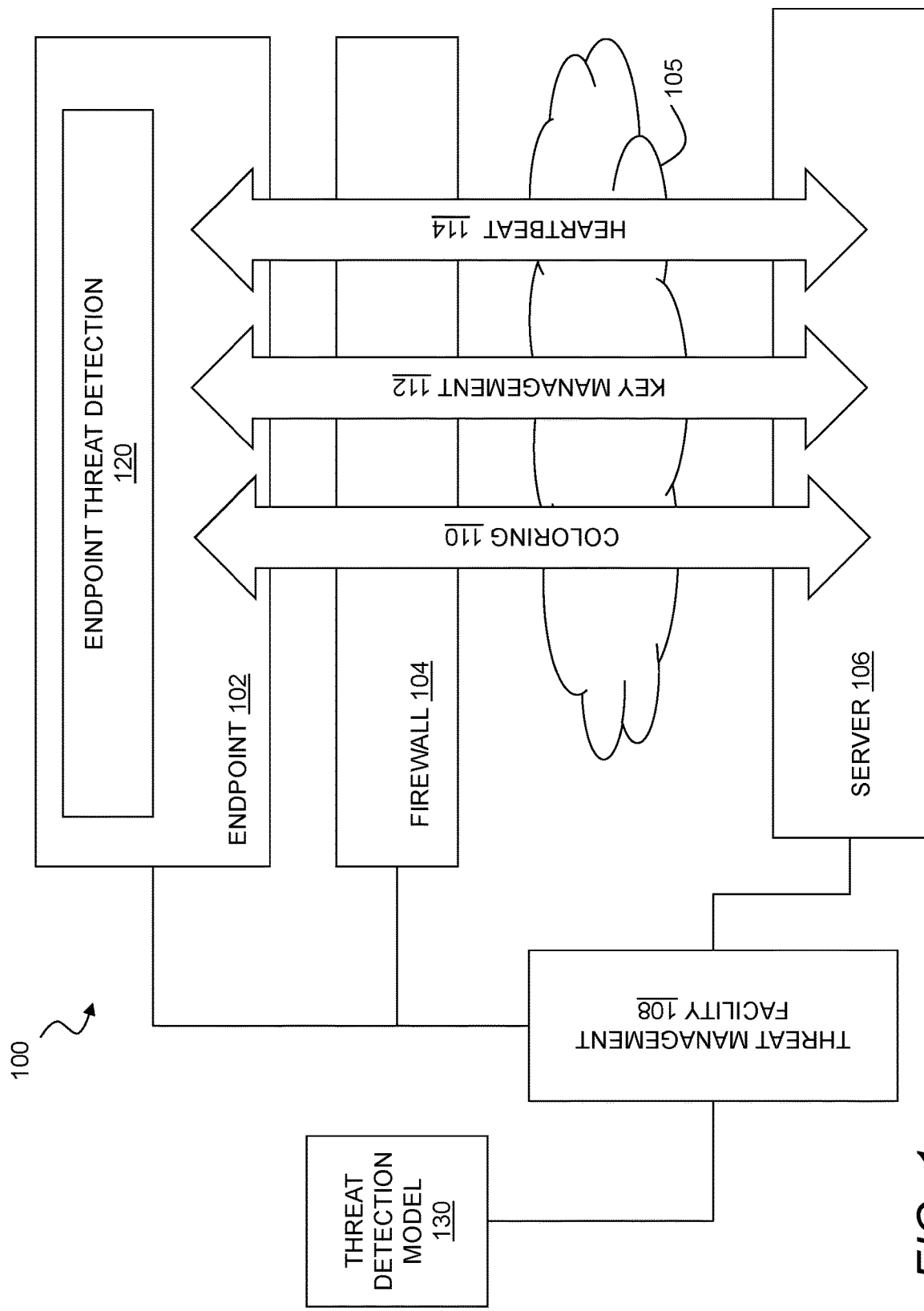
FIG. 1 illustrates a threat management system.

FIG. 1 illustrates a threat management system according to some implementations. In general, the system 100 may include an endpoint 102, a firewall 104, a server 106 and a threat management facility 108 coupled to one another directly or indirectly through a data network 105. Each of the entities depicted in FIG. 1 may, for example, be implemented on one or more computing devices such as the computing device described below with reference to FIG. 2. A number of systems may be distributed across these various components to support threat detection, such as a coloring system 110, a key management system 112 and a heartbeat system 114 (or otherwise an endpoint health system), each of which may include software components executing on any of the foregoing system components, and each of which may communicate with the threat management facility 108 and an endpoint threat detection agent 120 executing on the endpoint 102 to support improved threat detection and remediation.

The endpoint 102 may, for example, include a desktop or other computing device such as a laptop, tablet mobile device, cellular phone, virtual machine, server, or any other physical or virtual device that might couple to the network 105 to communicate with other devices and endpoints.

In general, the threat management facility 108 may help to secure the endpoint 102 and other devices coupled to an enterprise network against malicious software or other threats such viruses, spyware, adware, Trojans, intrusion, spam, phishing explorations, policy abuse, uncontrolled access and the like. Regardless of how categorized, the threat may need to be stopped at various points of a networked computing environment, such as the endpoint 102, the firewall 104, the server 106 and/or the threat management facility 108, or any other devices such as laptops, cellular phones, desktops, servers, gateways, communication ports, handheld or mobile devices, firewalls, and the like, and the threat management facility 108 may help to generally coordinate detection and remediation in this context.

In one aspect, this may include email security and control, e.g., where security management may help to eliminate spam, viruses, spyware and phishing, control of email content, and the like. The threat management facility 108 may also help to protect against other inbound and outbound threats, protect email infrastructure, prevent data leakage, provide spam filtering, and the like. The threat management facility may support other security techniques and services such as reporting on suspect devices, security and content filtering, active monitoring of network traffic, URI filtering, network access control, access to virtual private networks (VPN), host intrusion prevention, and so forth.

The system 100 may employ a model 130 such as a machine learning threat detection model to assist in analyzing software to detect malicious code. In general, the model 130 may use a classifier or any other suitable detection or recognition technology or technologies to attempt to classify code as malicious (or not malicious). For example, the model 130 may be trained using machine learning techniques and a training set based on known samples of malicious code so that the model 130 learns to recognize other code with similar static or behavioral features or attributes as malicious or otherwise unwanted. In some implementations, this type of machine learning detection model can usefully recognize malware characteristics to identify new malware families, polymorphic strains of existing families, and other variants and the like with similar characteristics. While the model 130 is illustrated as associated with the threat management facility 108, it will be appreciated that the model 130 may be deployed at the threat management facility 108, at the firewall 104, at the endpoint 102 (e.g., with the endpoint threat detection 120) or any other suitable location, as well as combinations of the foregoing, and may be correspondingly trained to identify malware based on observations available at one or more corresponding locations. A model may be used instead of or in combination with other classification, detection, or recognition technologies to identify malware or characterize a likelihood of a threat, a detection of a threat, and so forth.

The coloring system 110 may be used to label or color software objects for improved tracking and detection of potentially harmful activity. The coloring system 110 may, for example, label files, executables, processes, network communications, data sources and so forth with any suitable label. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. A network communication stream may inherit a color from the application that launched it, a machine that communicated it, and so forth. More generally, any type of labeling, as well as rules for propagating, inheriting, changing, or otherwise manipulating such labels, may be used by the coloring system 110 as contemplated herein. A coloring model, alone or in combination with other classifications, detections, or characteristics, may be used to assign one or more colors.

The key management system 112 may support management of keys for the endpoint 102 in order to selectively permit or prevent access to content on the endpoint 102 on a file-specific basis, a process-specific basis, an application-specific basis, a user-specific basis, or any other suitable basis in order to prevent data leakage, and in order to support more fine-grained and immediate control over access to content on the endpoint 102 when a security compromise is detected. Thus, for example, if a particular process executing on the endpoint is compromised, or potentially compromised or otherwise under suspicion, as determined by a model, alone or in combination with other classifications, detections, or characteristics, access by that process may be blocked (e.g., with access to keys revoked) in order to prevent, e.g., data leakage or other malicious activity.

The heartbeat system 114 may be used to provide periodic or aperiodic information from the endpoint 102 or other system components about system health, security, status, and so forth. The heartbeat system 114 or otherwise an endpoint health system may thus in general include a health status report system for the endpoint 102, such as through the use of a heartbeat system or the like. A heartbeat may be encrypted or plaintext, or some combination of these, and may be communicated unidirectionally (e.g., from the endpoint 108 to the threat management facility 108) or bidirectionally (e.g., between the endpoint 102 and the server 106, or any other pair of system components) on any useful schedule. In some implementations, the heartbeat system 114 may be used to securely communicate information about the health status of a device. In some implementations, the heartbeat system 114 may be used to communicate color information or other information (e.g., user information, source information, process information) about files, executables, processes, network communications, data sources and so forth. For example, a firewall 104 may use the heartbeat system 114 to request information from an endpoint 102 about an application associated with a network communication. For example, a firewall 104 may use the heartbeat system 114 to direct an endpoint 102 to take action to manage the endpoint 102 or the system 100 in response to a potential or actual security threat or for administrative purposes. For example, an endpoint 102 may use the heartbeat system 114 to communicate a determination by the endpoint threat detection agent 120 to other network entities or locations. In some implementations, the heartbeat system 114 may be used to communicate machine learning model outputs, such as an output from any of the machine learning models described herein, either alone or in combination with other classifications, detections, or characteristics, with respect to detections on files, executables, processes, network communications, data sources and so forth.

Figure 2:
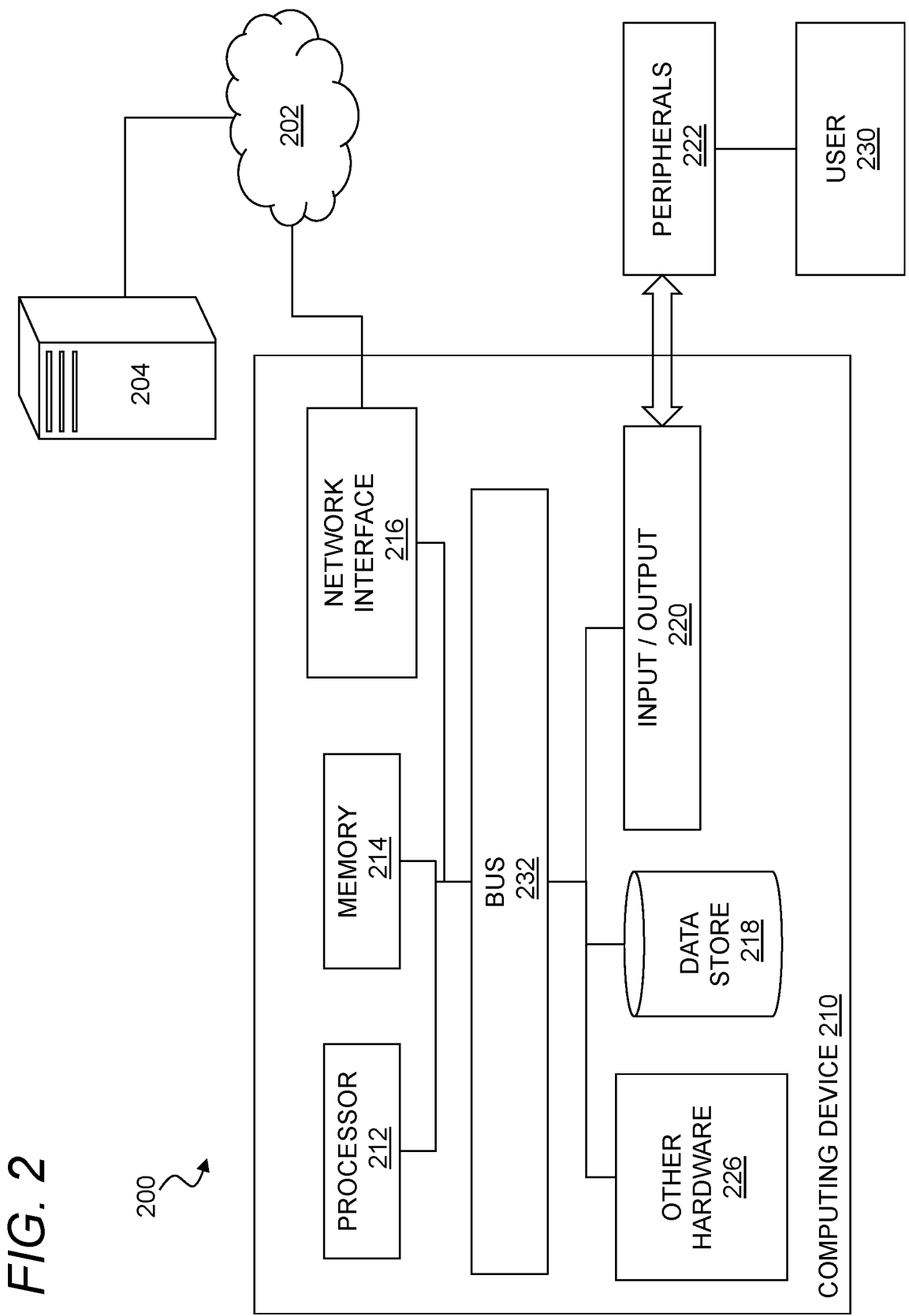
FIG. 2 illustrates a computer system.

FIG. 2 illustrates a computer system. In general, the computer system 200 may include a computing device 210 connected to a network 202, e.g., through an external device 204. The computing device 210 may be or include any type of network endpoint or endpoints as described herein, e.g., with reference to FIG. 1 above. For example, the computing device 210 may include a desktop computer workstation. The computing device 210 may also or instead be any suitable device that has processes and communicates over a network 202, including without limitation a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The computing device 210 may also or instead include a server, or it may be disposed on a server.

The computing device 210 may provide a physical or virtual device as a platform for any of the entities described in the threat management environment above with reference to FIG. 1. For example, the computing device 210 may be a server, a client, a threat management facility, or any of the other facilities or computing devices described therein. In certain aspects, the computing device 210 may be implemented using hardware (e.g., in a desktop computer), software (e.g., in a virtual machine or the like), or a combination of software and hardware (e.g., with programs executing on the desktop computer). The computing device 210 may be a standalone device, a device integrated into another entity or device, a platform distributed across multiple entities, or a virtualized device executing in a virtualization environment.

The network 202 may include the network 105 described above, which may be any data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.), fifth generation cellular technology (e.g., 5G), WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

The computing device 210 may include a processor 212, a memory 214, a network interface 216, a data store 218, and one or more input/output devices 220. The computing device 210 may further include or be in communication with peripherals 222 and other external input/output devices 224.

The processor 212 may be any as described herein, and may generally be capable of processing instructions for execution within the computing device 210 or computer system 200. The processor 212 may include a single-threaded processor or a multi-threaded processor. The processor 212 may be capable of processing instructions stored in the memory 214 or on the data store 218.

The memory 214 may store information within the computing device 210 or computer system 200. The memory 214 may include any volatile or non-volatile memory or other computer-readable medium, including without limitation a Random Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 200 and configuring the computing device 200 to perform functions for a user. The memory 214 may include a number of different stages and types for different aspects of operation of the computing device 210. For example, a processor may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 200 creates an execution environment for a computer program in question, e.g., code that constitutes processor firmware, a protocol stack, a database management system, an operating system, or a combination of the foregoing, and/or code that performs some or all of the steps set forth in the various flow charts and other algorithmic descriptions set forth herein. While a single memory 214 is depicted, it will be understood that any number of memories may be usefully incorporated into the computing device 210. For example, a first memory may provide non-volatile storage such as a disk drive for permanent or long-term storage of files and code even when the computing device 210 is powered down. A second memory such as a random access memory may provide volatile (but higher speed) memory for storing instructions and data for executing processes. A third memory may be used to improve performance by providing even higher speed memory physically adjacent to the processor 212 for registers, caching and so forth.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or communications through any other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, 5G, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or computer system 200 in a non-volatile form for subsequent retrieval and use. For example, the data store 218 may store the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

The computer system 200 may include a peripheral 222 for the computing device 210 such as any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control of or communications with other devices or components. Other I/O devices suitable for use as a peripheral 222 include haptic devices, three-dimensional rendering systems, augmented-reality displays, magnetic card readers, and so forth. In one aspect, the peripheral 222 may serve as the network interface 216, such as with a USB device configured to provide communications via short range (e.g., Bluetooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid state device, or an optical drive, a magnetic drive, a disk drive, or other device or combination of devices suitable for bulk storage. More generally, any device or combination of devices suitable for use with the computing device 200 may be used as a peripheral 222 as contemplated herein.

Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 200 such as the processor 212, memory 214, network interface 216, other hardware 226, data store 218, and input/output interface. As shown in the figure, each of the components of the computing device 210 may be interconnected using a system bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

Figure 3:
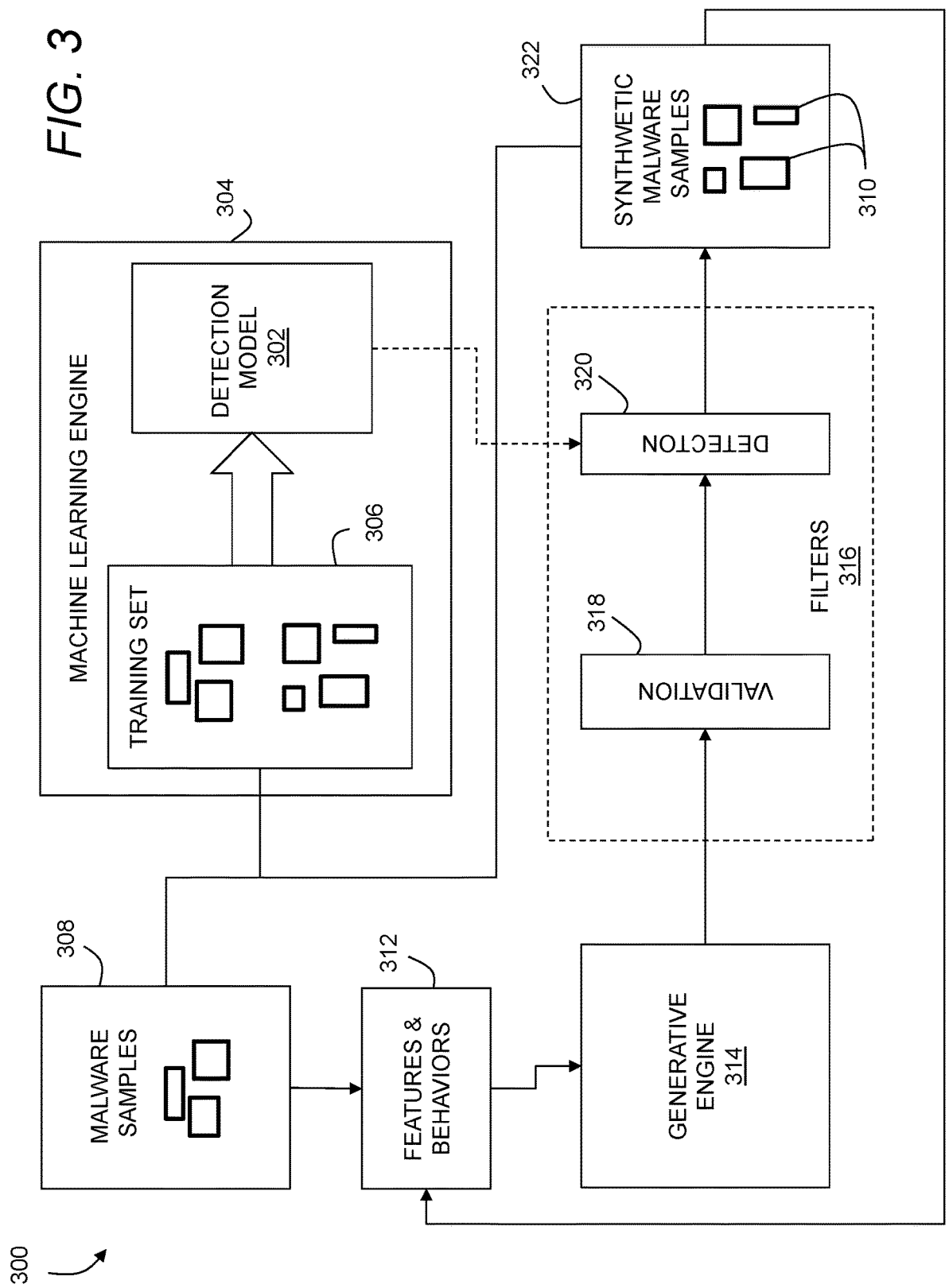
FIG. 3 illustrates a machine learning system.

FIG. 3 illustrates a machine learning system according to some implementations. In general, the machine learning system 300 operates to create a detection model 302 that can be deployed on one or more devices in an enterprise network to detect new malware. A machine learning engine 304 may process a training set 306, e.g., of known malware samples, to generate the detection model 302 using various machine learning techniques. Deep learning techniques are one form of machine learning that generates multiple hidden layers in an artificial neural network. These techniques have been successfully applied in a wide range of pattern recognition applications such as computer vision, facial recognition, speech recognition and so forth. However, a variety of other machine learning techniques are known in the art and may be adapted for use in creating the detection model 302 as contemplated herein. By way of non-limiting examples, suitable techniques include association rule learning, neural networks, inductive logic programming, support vector machines, clustering, Bayesian networks, genetic algorithms, rule-based machine learning and so forth.

The code samples in the training set 306 may be obtained, for example, from malware samples 308 that have been positively identified as malicious or otherwise unwanted. This may, for example, include scripts, executables, applications, libraries, modules and the like, alone or in combination, any of which may deploy malware such as adware, bots, bugs, advanced persistent threats, ransomware, rootkits, spyware, Trojans, viruses, worms and other code that performs undesirable, unwanted and potentially destructive tasks on an affected device. This may also or instead include messages or other communications such as phishing attacks intended to elicit compromising responses from end users. The machine learning engine 304 may programmatically learn to identify characteristics of these malware samples 308 to identify new but functionally similar or derivative code.

The code samples in the training set 306 may also or instead include synthetic malware samples 310 that have been programmatically generated based upon features 312 of actual malware samples 308, such as abstracted features and behaviors of the code samples in the training set 306. It is possible, for example, to generate perturbations or variations in code that eventually yield classification errors in a trained neural network's identification, and these code samples can be used in turn to increase the ability of the detection model 302 to accurately classify new code samples. The features 312 may include any abstracted features or behaviors of existing code that usefully characterizes operation of the code during execution.

The features 312 may be applied to a generative engine 314. The generative engine may use any suitable techniques for generating code based on the features 312 of the input code samples, such as by using known substitutions for abstracted features. For example, this may include variations (e.g., randomization, substitution rules) of the order or implementation of behaviors, variations to the coding or scripting instructions, variations in the order or format of inputs and outputs and so forth. This may also or instead include variations in text, graphics, words, languages and so forth. In another aspect, this may include the use of packers, encryption, compression and the like to obscure existing code. In another aspect, this may include randomizing code inputs, e.g., using a fuzzer or the like to automatically test a range of inputs in an attempt to identify exploitable holes or vulnerabilities in a target platform or code. Thus, in one aspect, the code may remain unchanged, but inputs to the code, or outputs from the code to a target system, may be varied in order to achieve different computational results. This may include a human-guided process, an automated process or some combination of these.

In one aspect, the generative engine 314 may include a generative adversarial network. In some implementations, the generative adversarial network may employ unsupervised machine learning, implemented with two neural networks that compete with one another. In the context of generating malware, one neural network (a generative engine) may generate candidate samples based on known malware samples or abstracted descriptions of known malware samples. The second neural network (a discriminative engine) may analyzes these generated candidates to evaluate a likelihood of whether they come from the generative engine or original, known malware samples, while the generative engine seeks to generate new code that evades proper classification. Backpropagation can be applied to both engines to promote continuous improvement, e.g., so that the generative engine produces malware samples more like real-world samples while the discriminative engine becomes better at identifying malware variations.

More generally, a variety of other techniques are known for generating code including automatic programming, generative programming and the like, and of which may also or instead be used to create synthetic malware samples based upon abstracted features, generic descriptions and other inputs, parameters, features, behaviors, characteristics and so forth.

After candidate samples have been generated, one or more filters 316 may be applied in order to ensure that the resulting code samples provide a useful training set for improving the machine learning engine 304. The one or more filters 316 may, for example, include a validation module 318 or process to validate the candidate samples, such as by executing each sample in a sandbox or otherwise verifying that the generated code can execute or perform a potentially or nominally malicious task on a target platform. Such a filter 316 usefully avoids training the machine learning engine 304 against samples that are incapable of performing malicious tasks. The filters 316 may also or instead include a detection module 320 or process that tests whether the synthesized code can be detected by the existing detection model 302. This latter filter 316 may usefully reduce the amount of processing required within the machine learning engine 304 by avoiding additional training of the machine learning engine 304 with samples that can already be detected with the current detection model 302.

These and any other useful filters 316 may be applied to output from the generative engine 314 to provide a set of synthetic malware samples 322 that can be added to the training set 306 for the machine learning engine 304. The system 300 may also provide additional features and functions to support iterative improvement and refinement to the malware generation and machine learning processes. For example, the synthetic malware samples 322 may be analyzed to identify abstracted features and behaviors that can be used to seed the features and behaviors 312 used by the generative engine. In this manner, if the generative engine 314 produces, e.g., a new order of steps or a new function call that embody a new, successful exploit, this new exploit can be used to seed further perturbations and variations that further extend the range of detectable malware. In another aspect, the inputs to and output from the generative engine 314 may be logged over time, e.g., in order to prevent repeating analyses that might waste computer resources and/or introduce biases into the detection model 302.

According to the foregoing, there is disclosed herein a threat detection system including a machine learning engine and an endpoint. The machine learning engine may be configured to train a detection model for an antimalware system by iteratively generating synthetic malware samples based on one or more functional blocks of malware samples in a training set, filtering the synthetic malware samples to remove inoperable code samples and code samples that can be detected by a prior detection model trained to detect the malware samples, and training a new detection model until a receiver operating characteristic for the new detection model achieves a predetermined threshold for true positive detection. In this context, examples of functional blocks suitable for creating synthetic malware samples may include, but are not limited to, such elements or combinations of elements as creation or modification of certain types of values of registry keys on Microsoft Windows operating systems; creation of certain system processes, injection of code into existing processes, modification of system files; attempts to tamper with program control flows; attempts to reduce or defeat defensive randomization techniques; attempts to discover and/or evade the presence of debugging and/or virtualization and/or protective software on a system; attempts to read or modify protected memory regions; attempts to use legitimate system application programming interfaces (APIs) to discover system states or values in ways that are characteristic of a sequence within an attack; attempts to introduce and/or conceal and/or execute shellcode; attempts to conduct direct or side-channel attacks against cryptosystems, privileged system resources, or otherwise protected system components, attempts to access key material or otherwise intercept or control cryptographic processes, and so forth. More generally, any functional block of code performing a known malicious action or potentially malicious action, or performing a substep, prerequisite or supporting function for such action, may be a functional block as contemplated herein. The endpoint may be coupled to an enterprise network and configured to deploy the detection model to detect malicious received through the enterprise network.

Figure 4:
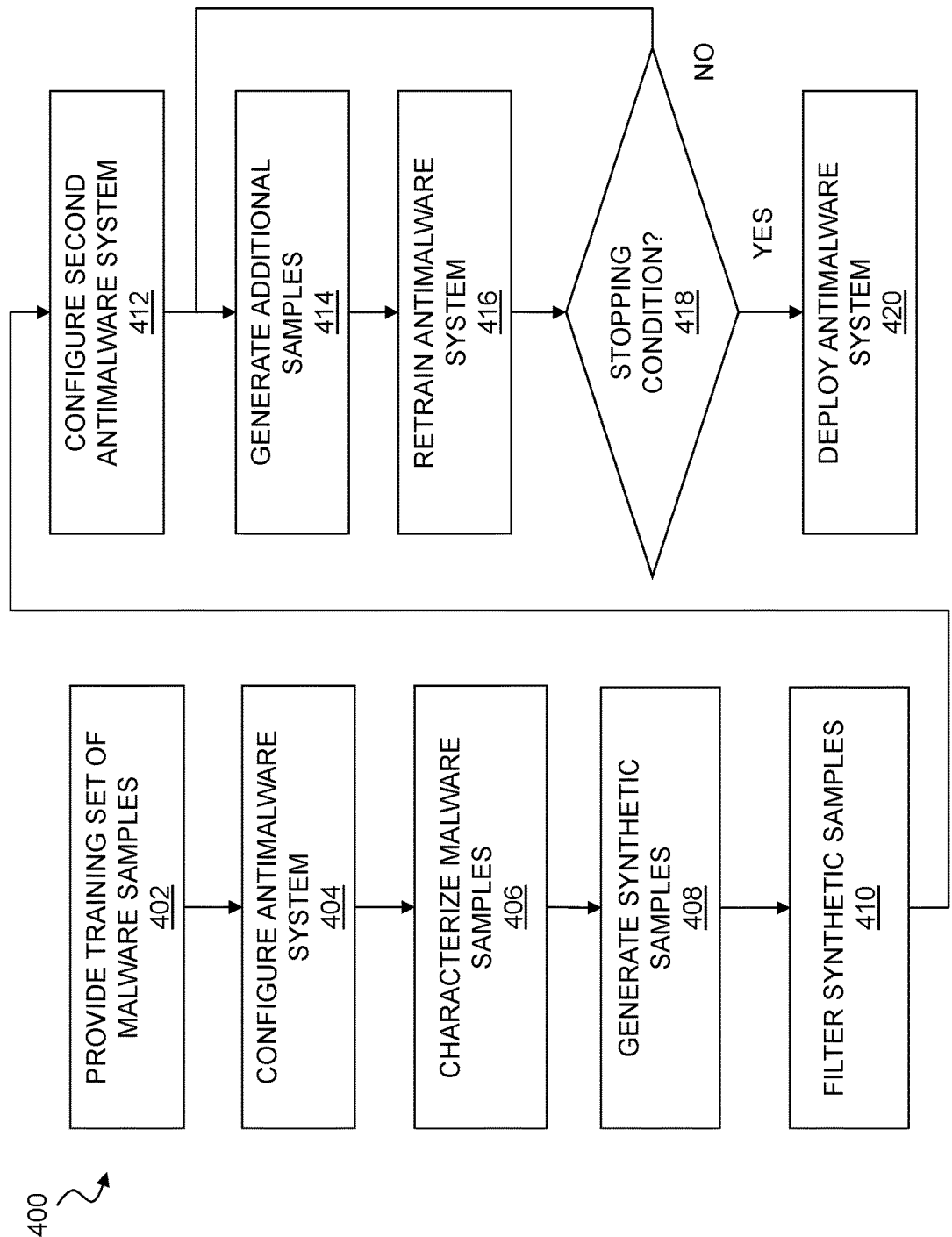
FIG. 4 illustrates a method for machine learning.

FIG. 4 shows a method for training a machine learning system to detect malware according to some implementations.

As shown in step 402, the method 400 may include providing a training set, such as by providing a first training set include a plurality of malware samples. This may include malware samples that have been identified and gathered in any suitable manner, and that have been selected for inclusion in a machine learning process for creating a malware detection model.

As shown in step 404, the method 400 may include configuring a first antimalware system to detect the malware samples, e.g., by using any of the machine learning or similar techniques described herein.

As shown in step 406, the method 400 may include characterizing one or more functional blocks of the malware samples. This may include any automated techniques, manual techniques or combination of these for extracting abstracted features, functions behaviors or the like of the malware samples into a form suitable for processing by a machine learning system. In general, this may be at any suitable level of abstraction, and may include simple steps or functions as well as complex routines, calculations and so forth.

As shown in step 408, the method 400 may include generating synthetic samples based on the one or more functional blocks of the malware samples characterized in step 406. This may include code generation using the generative engine described above, which may, for example, apply any of a variety of automated programming techniques, code generation techniques, or generative adversarial network techniques to create new code based on the original malware samples in the training set.

In one aspect, generating the number of synthetic malware samples includes generating code with a generative engine of a generative adversarial network. Generating the number of synthetic malware samples may also or instead include testing generated samples with a discriminative engine of a generative adversarial network. Generating the number of synthetic malware samples may include generating code based on known variants of the one or more functional blocks, or generating code based on known substitutes for the one or more functional blocks. Generating the number of synthetic malware samples may also or instead includes applying a fuzzer to one or more of the plurality of malware samples in the first training set, e.g., in order to generate randomized inputs to or outputs from the malware samples that might stimulate different, and in particular, compromised responses from a target platform. Generating the number of synthetic malware samples may similarly include applying a randomizer to one or more of the plurality of malware samples in the first training set.

As shown in step 410, the method 400 may include filtering the synthetic samples. This may, for example, include validating the number of synthetic malware samples to provide a validated sample set containing one or more of the synthetic malware samples that execute and perform an unwanted task in a target computing context. For example, validating the number of synthetic malware samples may include executing each of the number of synthetic malware samples in a sandbox while monitoring the results in order to ensure that the code executes and performs an unwanted (or potentially or nominally unwanted) task. In this manner, the filtering can ensure that only valid code is included in subsequent training sets.

Filtering may also or instead include filtering malware samples such as the validated sample set to provide a filtered sample set containing one or more of the synthetic malware samples (e.g., in the validated sample set) that are not detected by the first antimalware system. In particular, filtering may include removing any of the synthetic malware samples substantially identical to one of the plurality of malware samples or removing any one of the synthetic malware samples substantially identical to another one of the synthetic malware samples. In this manner, repeats of synthetic samples, or synthetic samples that do not substantially vary the underlying source samples, may be removed from future training sets in order to conserve computational resources. As noted above, code generation may also be monitored to prevent or avoid repeat generations of identical or nearly identical candidate samples.

As shown in step 412, the method 400 may include configuring a second antimalware system. This may, for example, include creating a second antimalware system by training a machine learning malware detection engine to detect malicious code including the synthetic malware samples in the validated sample set. Depending upon the machine learning techniques employed, this may be achieved with an incremental training to the new samples, or a complete retraining using a training set that contains the original malware samples and the filtered sample set obtained from the generative engine.

As shown in step 414, the method 400 may include generating a second number of synthetic malware samples based on functional blocks of the synthetic malware samples in the validated sample set, and also validating and filtering the second number of synthetic malware samples to provide a second training set.

As shown in step 416, the method 400 may include retraining the antimalware system. This may include creating a third antimalware system by training the machine learning malware detection engine to detect synthetic malware samples in the second training set.

As shown in step 418, the method 400 may include determining whether a stopping condition such as a predetermined threshold for iterations has been reached. The predetermined threshold may, for example, include a receiver operating characteristic for the new (e.g., retrained) antimalware system, which usefully provides a figure of merit for detection accuracy by measuring true positive detections against false positive detections. More generally, any suitable threshold or stopping condition for measuring the accuracy of the detection model may also or instead be employed.

If the stopping condition is not met, the method 400 may return to step 414 where additional samples may be generated for additional processing. Thus, the method 400 may include iteratively repeating the generating, validating, filtering and creating a new antimalware system until a predetermined threshold or stopping condition is reached. In this manner, the techniques contemplated herein may be iteratively repeated any number of times in order to expand the range of functional and potentially malicious code that can be detected and to improve the ability of the detection model to correctly classify new and previously unseen malware. The use of an objective stopping condition usefully permits unsupervised, iterative refinement to the detection model until a user-specified result is achieved. If the stopping condition is met, the method 400 may proceed to step 420.

As shown in step 420, the method may include deploying an antimalware system such as an antimalware system created using any of the steps described above. This may, for example, include deploying the second antimalware system on an endpoint, deploying the second antimalware system on a gateway to an enterprise network, deploying the second antimalware system at a threat management facility for an enterprise network or any combination of these, as well as deploying the second antimalware system at any other location or combination of locations where events or actions might be observed and used to detect the presence of malicious code. The antimalware system may generally be used to detect malware in an enterprise network.

For example, deploying the antimalware system may include detecting malware on an endpoint in an enterprise network with the antimalware system and initiating a remediation of the endpoint. It will be appreciated that a wide range of remediation measures are known in the art, and may vary according to, e.g., the type of threat, the likelihood of an accurate detection, the endpoint affected, and so forth.

Remedial action may, for example, include terminating or modifying an ongoing process or interaction, sending a warning or other notification to an administrator, executing a program or application to remediate against a threat or violation, initiating a logging of actions for subsequent evaluation, or the like. The remedial action may also or instead include blocking network activity, initiating a malicious code scan, quarantining an endpoint (or a process or application on the endpoint) and so forth. More generally, any remedial action suitable for temporarily or permanently addressing the detected threat may usefully be employed as a remedial action in response to a threat detection as contemplated herein.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context. Absent an explicit indication to the contrary, the disclosed steps may be modified, supplemented, omitted, and/or re-ordered without departing from the scope of this disclosure.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product comprising computer executable code embodied in a non-transitory computer readable medium that, when executing on one or more computing devices, performs the steps of:
providing a first training set including a plurality of malware samples;
configuring a first antimalware system to detect the malware samples;
characterizing one or more functional blocks of the malware samples by extracting abstracted features, functions, or behaviors of the malware samples to provide characterizations of the one or more functional blocks;
generating a first number of synthetic malware samples including modifications of the one or more functional blocks of the malware samples based on the characterizations;
validating the first number of synthetic malware samples to provide a validated sample set containing one or more of the first number of synthetic malware samples that execute and perform an unwanted task in a target computing context;
filtering the validated sample set to provide a filtered sample set containing one or more of the first number of synthetic malware samples in the validated sample set that are not detected by the first antimalware system;
creating a second antimalware system by training a machine learning malware detection engine to detect malicious code including the one or more of the first number of synthetic malware samples in the filtered sample set;
repeating one or more of generating, validating, filtering, or training until a predetermined threshold for positive detection by the second antimalware system is reached; and
deploying the second antimalware system on an endpoint.

2. A method comprising:
providing a first training set including a plurality of malware samples;
configuring a first antimalware system to detect the malware samples;
generating a first number of synthetic malware samples including modifications of the malware samples based on abstracted features, functions, or behaviors of the malware samples;
validating the first number of synthetic malware samples to provide a validated sample set containing one or more of the first number of synthetic malware samples that execute and perform an unwanted task in a target computing context;
filtering the validated sample set to provide a filtered sample set containing one or more of the first number of synthetic malware samples in the validated sample set that are not detected by the first antimalware system;
creating a second antimalware system by training a machine learning malware detection engine to detect malicious code including the one or more of the first number of synthetic malware samples in the filtered sample set;
repeating one or more of generating, validating, filtering, or training until a predetermined threshold for positive detection by the second antimalware system is reached; and
deploying the second antimalware system on an endpoint.

3. The method of claim 2 wherein generating the first number of synthetic malware samples includes generating code with a generative engine of a generative adversarial network.

4. The method of claim 2 wherein generating the first number of synthetic malware samples includes testing generated samples with a discriminative engine of a generative adversarial network.

5. The method of claim 2 further comprising characterizing one or more functional blocks of the malware samples by extracting the abstracted features, functions, or behaviors of the malware samples to provide characterizations of the one or more functional blocks.

6. The method of claim 5 wherein generating the first number of synthetic malware samples includes generating code based on known variants of the one or more functional blocks.

7. The method of claim 5 wherein generating the first number of synthetic malware samples includes generating code based on known substitutes for the one or more functional blocks.

8. The method of claim 2 wherein generating the first number of synthetic malware samples includes applying a fuzzer to one or more of the plurality of malware samples in the first training set.

9. The method of claim 2 wherein generating the first number of synthetic malware samples includes applying a randomizer to one or more of the plurality of malware samples in the first training set.

10. The method of claim 2 wherein validating the first number of synthetic malware samples includes executing each of the first number of synthetic malware samples in a sandbox.

11. The method of claim 2 wherein filtering includes removing any of the first number of synthetic malware samples substantially identical to one of the plurality of malware samples.

12. The method of claim 2 wherein filtering includes removing any one of the first number of synthetic malware samples substantially identical to another one of the first number of synthetic malware samples.

13. The method of claim 2 wherein the predetermined threshold includes a receiver operating characteristic for the second antimalware system.

14. The method of claim 2 further comprising deploying the second antimalware system on a gateway to an enterprise network.

15. The method of claim 2 further comprising deploying the second antimalware system at a threat management facility for an enterprise network.

16. The method of claim 2 further comprising using the second antimalware system to detect malware in an enterprise network.

17. The method of claim 2 further comprising detecting malware on an endpoint in an enterprise network with the second antimalware system and initiating a remediation of the endpoint.

18. The method of claim 2, further comprising generating a second number of synthetic malware samples based on functional blocks of the synthetic malware samples in the validated sample set to provide a second training set.

19. The method of claim 18, further comprising creating a third antimalware system by training the machine learning malware detection engine to detect synthetic malware samples in the second training set.

20. A system comprising:
  a threat management facility including a first memory storing computer-executable code for deploying a machine learning engine configured to train a detection model for an antimalware system by training a detection model to detect malicious code in one or more of a number of malware samples in a training set, generating synthetic malware samples including modifications of one or more functional blocks of the number of malware samples in the training set based on abstracted features, functions, or behaviors of the functional blocks, filtering the synthetic malware samples to update the training set with synthetic malware samples that are undetectable by the detection model and that are operable, and repeating one or more of training, generating, and filtering until a receiver operating characteristic for the detection model achieves a predetermined threshold for true positive detection; and
  an endpoint coupled to an enterprise network, the endpoint including a second memory storing computer-executable code for deploying the detection model to detect malicious code received through the enterprise network.

* * * * *